Jan. 3, 1967  A. J. HANLON  3,295,417
APPARATUS FOR CUTTING OPTICAL ELEMENTS
Filed Oct. 7, 1965  3 Sheets-Sheet 1

INVENTOR.
Albert J. Hanlon
BY Brown and Mikulka
ATTORNEYS

Jan. 3, 1967   A. J. HANLON   3,295,417
APPARATUS FOR CUTTING OPTICAL ELEMENTS
Filed Oct. 7, 1965   3 Sheets-Sheet 2

INVENTOR.
Albert J. Hanlon
BY
Brown and Mikulka
ATTORNEYS

United States Patent Office 3,295,417
Patented Jan. 3, 1967

3,295,417
APPARATUS FOR CUTTING OPTICAL ELEMENTS
Albert J. Hanlon, Somerville, Mass., assignor to Polaroid Corporation, Cambridge, Mass., a corporation of Delaware
Filed Oct. 7, 1965, Ser. No. 493,739
9 Claims. (Cl. 90—13.9)

This invention relates to apparatus for cutting optical elements, and more particularly to apparatus for cutting from a synthetic optical material optical elements having a predetermined profile.

Cutting apparatus of the type with which this invention is concerned should have certain desirable characteristics. One of these characteristics is that the spindle assembly on which the blanks of optical material to be cut are held should not be rotating as the cutter and the blanks come into engagement. The reason for this is that the spindle rotates in the direction opposed to that of the cutter and overloading of the cutter drive motor at the time of engagement or clogging of the cutter otherwise is apt to occur. It is another desirable characteristic of such apparatus that the spindle assembly should begin to turn at the instant the blanks engage the cutter. This prevents the cutter from dwelling in one spot on the blanks too long with the possibility of overheating the blanks.

Accordingly, it is a primary object of this invention to provide apparatus for cutting optical elements having means for preventing rotation of the blanks of optical material before the blanks engage the cutter and for initiating rotation of the blanks upon engagement with the cutter.

It is another object of this invention to provide apparatus for cutting optical elements which has the capability of a high production rate.

It is still another object of this invention to provide apparatus for cutting optical elements which is able to accurately cut optical elements with a smooth edge and a predetermined profile.

It is a further object of this invention to provide apparatus for cutting optical elements which includes means for finely adjusting the size of the optical elements cut.

Other objects of this invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
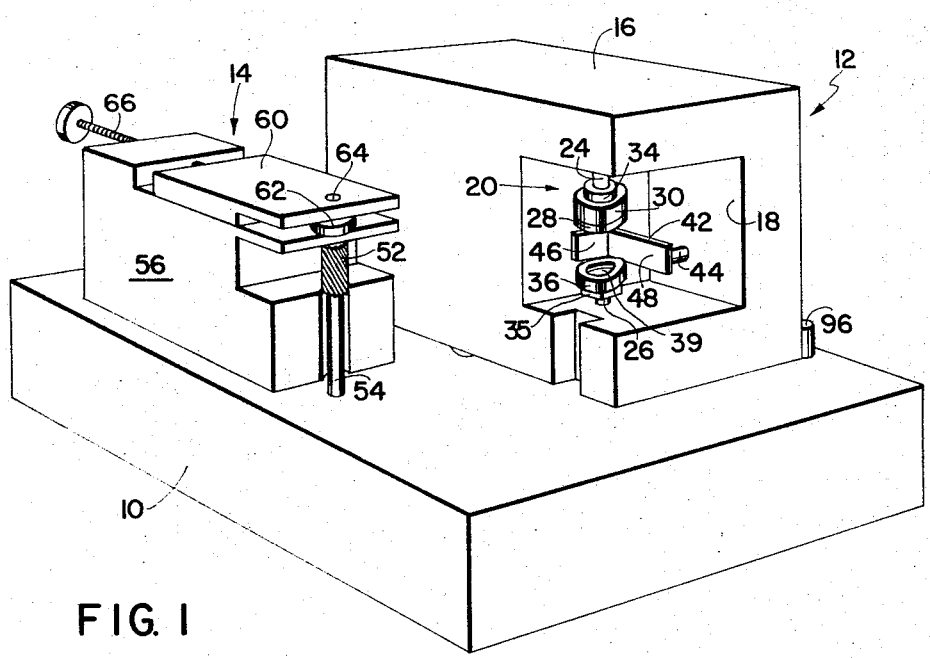
FIGURE 1 is a perspective view of the apparatus embodying the invention.

The drawings illustrate one possible embodiment of the invention. Referring to these drawings, and particularly to FIGURE 1, the illustrated embodiment will be seen to comprise a base 10 supporting a head assembly 12 and a cutter assembly 14.

Figure 2:
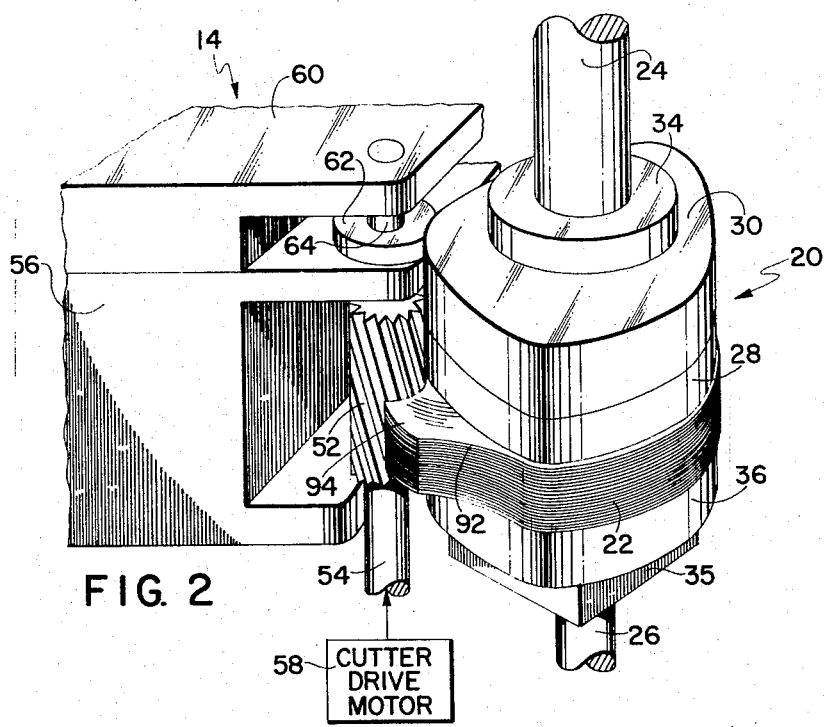
FIG. 2 is a partial perspective view of the spindle assembly and a portion of the cutter assembly, showing the cutter cutting optical elements from a stack of blanks.

The head assembly 12 includes a housing 16 having a recess 18 within which the cutting operation takes place and a spindle assembly 20 functioning to securely hold one or a stack of blanks 22 during the cutting operation. Referring to FIG. 2, the spindle assembly 20 comprises a rotatable upper shaft 24 and a rotatable lower shaft 26. The upper shaft 24 supports an upper clamping block 28 which engages the uppermost blank in a stack of blanks; the shaft 24 also supports a cam 30 having the profile which it is desired that the cut optical elements have. The clamping block 28 and the cam 30 are secured upon the upper shaft 24 by a collar 34. The lower shaft 26 supports a base member 35, which in turn mounts a lower clamping block 36. The clamping blocks 28, 36 are formed from a material having a coefficient of friction great enough to prevent slippage of the blanks 22 when clamped between the clamping blocks 28, 36. One material which has been found to be suitable for this purpose is Bakelite.

Figure 3:
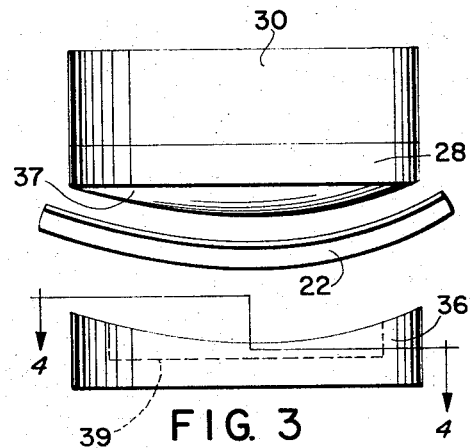
FIG. 3 is a partial side view of a portion of the spindle assembly, illustrating the configuration of a blank and the configurations of the clamping surfaces of upper and lower clamping blocks.
Figure 4:
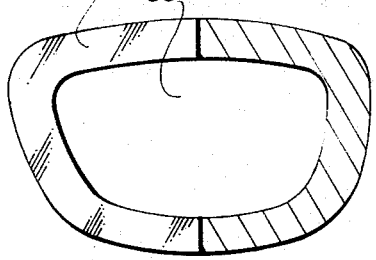
FIG. 4 is a partial section view taken on lines 4—4 in FIG. 3.

Viewing FIGS. 3 and 4, the clamping blocks 28, 36 have mating convex and concave clamping surfaces 37, 38, respectively. The configurations of the surfaces 37, 38 conform to the surfaces of a blank 22. The illustrated blank 22 is a blank from which a sunglass lens may be cut; however, various other configurations and applications are within the contemplation of the invention. The lower clamping block 36 has a central recessed portion 39. Hence, the clamping surface 38 on the lower clamping block 36 consists of the marginal area around the recessed portion 39. This arrangement minimizes the possibility of having dirt, scrap or any other irregularity in the configuration of the clamping surfaces 37, 38 act as a pivot which might allow relative angular movement to occur between the upper clamping block 28 and lower clamping block 36.

In order that optical elements having various profiles may be cut with the cutting apparatus, the clamping blocks 28, 36 and the cam 30 are made easily interchangeable with other sets of clamping blocks and cams having different profiles.

It is necessary to precisely align the stack of blanks 22 with respect to the upper and lower clamping blocks 28, 36. This alignment function is accomplished by a generally L-shaped alignment member 42 supported within the housing 16 upon a support rod 44. (See FIG. 4.) The alignment member 42 has a pair of mutually perpendicular vertical aligning surfaces 46, 48 which facilitate alignment of a rectangular blank between the clamping blocks 28, 36. Preferably, means may be provided with which the alignment member 42 can be adjusted in a plane perpendicular to the axis of the spindle assembly 20; however, for clarity of illustration, such means has not been shown.

Means are provided, but not shown, by which the alignment member 42 is drawn out of the way after the blanks 22 have been clamped between the clamping blocks 28, 36. These means are necessary in order to prevent the alignment member 42 from interfering with the rotation of the blanks 22 during a cutting operation.

In order that a blank or a stack of blanks may be clamped between the upper clamping block 28 and the lower clamping block 36 clamping motive means 50 are provided in the head assembly 12 for axially moving the upper shaft 24 and thus the upper clamping block 28 with respect to the lower shaft 26 and lower clamping block 36. The clamping motive means 50 is illustrated diagrammatically in FIG. 5. The clamping motive means would preferably comprise a hydraulically driven cylinder on the upper shaft 26; however, manual or other powered means would be suitable.

The cutting function is accomplished by a cutter 52 comprising a part of the cutter assembly 14. The cutter 52 may be a shell end mill cutter or any other suitable cutter. The cutter 52 is mounted upon a cutter drive shaft 54 supported in a cutter mount 56. The cutter drive shaft 54 is driven by cutter drive motor, illustrated diagrammatically in FIG. 2 at 52. A slide 60 reciprocably mounted upon the cutter mount 56 carries a cam follower in the form of a roller 62 rotatably mounted upon a pin 64. A screw 66 operating on the slide 60 provides means for adjusting the position of the roller 62 along a radial line from the axis of the spindle assembly 20. By varying the position of the roller 62, the size of the optical elements cut by the cutter 52 can be finely adjusted, as will be described in more detail hereinafter.

Figure 6:
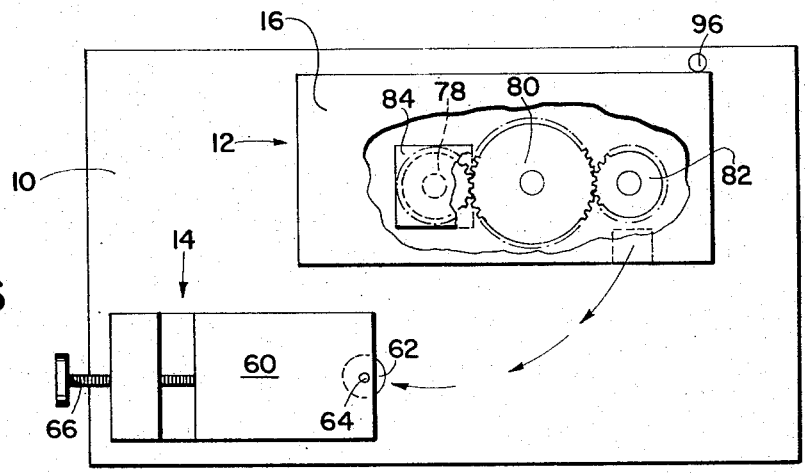
FIG. 6 is a top view of the apparatus embodying the invention, a portion of the housing for the head assembly being broken away to show certain internal components.

The cutter assembly 14 and portions of the head assembly 12 including the spindle assembly 20 have been thus far described. It is evident that means are required for driving the spindle assembly 20 and also for bringing the cutter assembly 14 and the spindle assembly 20 together. These functions are both accomplished by means illustrated in FIGS. 5 and 6. These means include a geared-down drive motor 68 illustrated diagrammatically in FIG. 5, driving an input shaft 70.

Mounted on the input shaft 70 is a spur gear 72 which meshes with an idler gear 74 which in turn drives a spur gear 76 on lower shaft 26. A similar gear train drives the upper shaft 24—spur gear 78 meshes with idler gear 80 which drives spur gear 82 on the upper shaft 24. A driving connection is effected between the input shaft 70 and the housing 16 through a friction clutch 84. A heavy duty friction clutch 85 is interposed in the input shaft between the drive motor 68 and the spur gear 72. The clutch 85 is capable of transmitting greater maximum torque than clutch 84.

Figure 7:
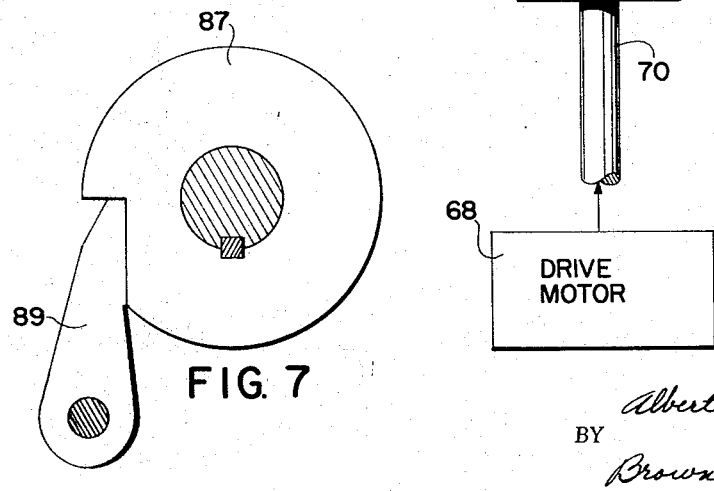
FIG. 7 is a section view taken on lines 7—7 in FIG. 5.

Referring to FIG. 7 one toothed ratchet wheel 87 and pawl 89 provide means for indexing the spindle assembly 20.

Figure 5:
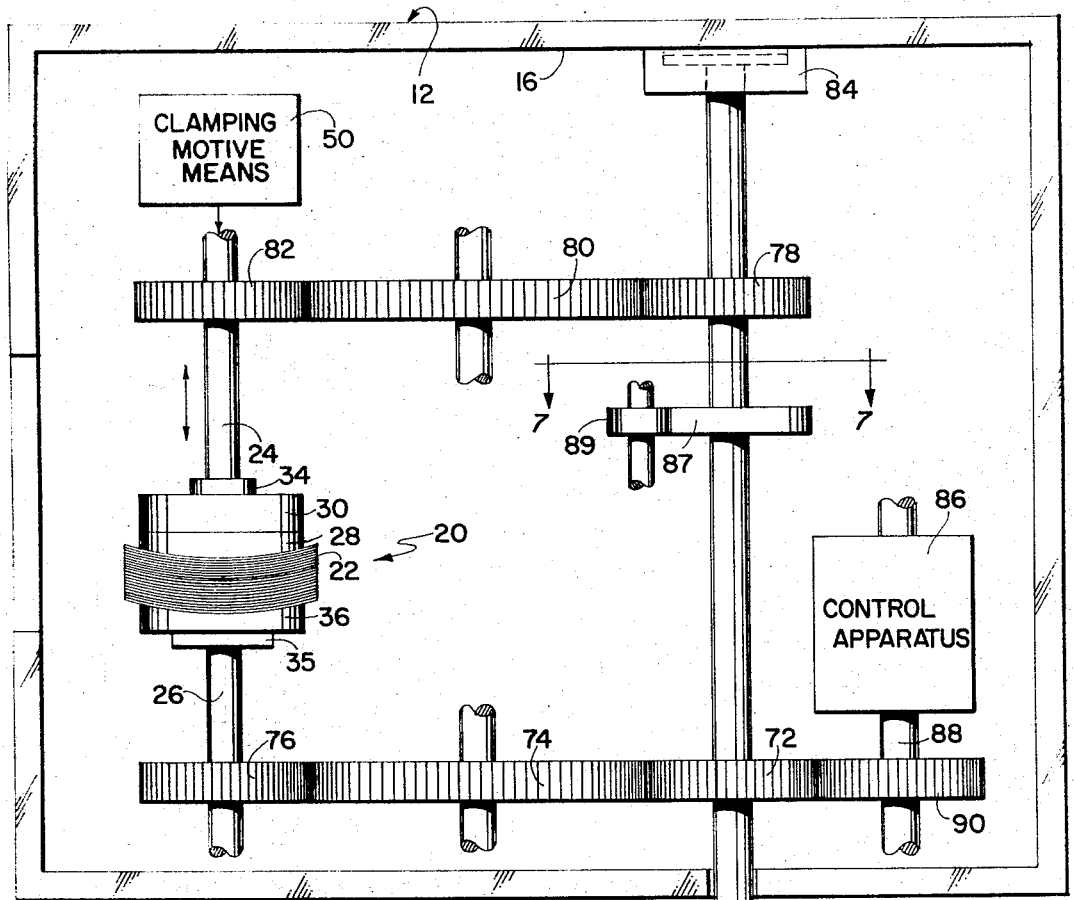
FIG. 5 is a diagrammatic illustration of the arrangement for driving the spindle assembly and for rotating the head assembly.

All of the elements comprising the means by which control of the application of power during a cycle of operation is accomplished are lumped and represented diagrammatically at 86 in FIG. 5. The control apparatus 86 may include a stack of timing cams which operate switches in a switching program, the timing cams being mounted on a shaft 88 driven by the gear 72 and a spur gear 90 on shaft 88. As described below, the control apparatus 86 controls the actuation of the clamping motive means 50, the means (not shown) employed for retracting the alignment member 42, the cutter drive motor 58, and the drive motor 68.

A cycle of operation of the apparatus is completely automatic after a stack of blanks 22 has been manually located on the lower clamping block 36. The operation thereafter is described below. Closing of a starting switch first causes the cutter drive motor 58 and the clamping motive means 50 to be energized. Energization of the motive means 50 causes the upper clamping block 28 to be driven downward from a raised position (see FIGS. 1 and 3) into clamping engagement with a stack of blanks 22 (see FIGS. 2 and 5). In FIG. 5, as the clamping motive means 50 drives the upper clamping block 38 downward, the upper shaft 24 moves through the spur gear 82; the spur gear 82 does not move out of engagement with idler gear 80 at any time.

After the blanks 22 have been clamped between the upper clamping block 28 and the lower clamping block 36, the alignment member 42 is withdrawn and means included in the control apparatus 86 cause the drive motor 68 to be energized. The drive motor 68 drives the input shaft 70 in the clockwise direction (in FIG. 6). Friction clutch 84 couples the drive from the input shaft 70 directly to the housing 16, causing the housing 16 and the entire head assembly 12 to be rotated clockwise away from the rest position toward the cutter assembly 14 (see FIG. 6). At this time the friction clutch 84 has not yet begun to slip, hence no rotary drive is yet imparted to the spindle assembly 20. However, the instant the stack of blanks 22 engage the rotating cutter 52, friction clutch 84 is no longer able to withstand the torque imposed upon it by the drive motor 68 through the input shaft 70, and it begins to slip. Slippage of the clutch 84 causes the upper shaft 24 to be driven through the gear train comprising gears 78, 80 and 82 and the lower shaft to be driven through the gear train comprising gears 72, 74 and 76. Thus the spindle assembly 20 is not rotating when the blanks 22 come into engagement with the cutter 52; this is desirable in order to prevent clogging of the cutter 52 and/or overloading of the cutter drive motor 58. It is also important to note that the spindle assembly 20 is caused to rotate at the instant the blanks 22 engage the cutter 52. Thus, viewing the cutter entry line 92 in FIG. 2 through the scrap 94, it will be evident that the cutter 52 does not dwell in one spot at any time, but rather has an angular component, with respect to the spindle assembly 20, at all times. This is desirable from the standpoint of preventing overheating of the blanks 22.

As stated above, the profile of the cam 30 on upper shaft 24 dictates the profile of the optical elements cut from the blanks 22 by the cutter 52. This is because the roller 62, the axis of which is fixed with respect to the cutter 52 during a cycle of operation, follows the profile of the cam 30 as the spindle assembly 20 rotates. Drag imposed on the housing 16 by the friction clutch 84 biases the spindle assembly 20 towards the cutter 52 as the blanks 22 are being cut, and thus holds the cam 30 against the roller 62.

As mentioned above, fine adjustments in the size of the optical elements cut can be made by means of screw 66. Rotation of the screw 66 varies the position of the roller 62 with respect to the cutter 52 along a radial line from the axis of the spindle assembly 20, and thus varies the bite of the cutter 52 and the size of the optical elements cut.

When the spindle assembly 20 has been driven from its index position through a complete revolution plus an additional displacement sufficient to insure the complete removal of scrap 94 from the blanks 22, timing means comprising a part of the control apparatus 86 causes a reversal in the polarity of the electrical supply to the reversible drive motor 68. As the motor 68 then drives the input shaft 70 in the counterclockwise direction (in FIG. 6), the friction clutch 84 transmits the torque on the input shaft 70 to the housing 16, thus causing the head assembly 12 to be rotated in the counterclockwise direction away from the cutter assembly 14. When the head assembly 12 has been rotated to its rest position against a stop pin 96, friction clutch 84 again slips, causing the spindle assembly 20 to be driven in the counterclockwise direction to its index position. Referring to FIG. 7, the spindle assembly 20 is stopped precisely at its index position by the abutting engagement of the pawl 89 with the step on the ratchet wheel 87. A time delay switch (not shown), comprising part of the control apparatus 86 is connected in series with the drive motor 68. The delay switch is actuated automatically by the head assembly 12 as it reaches its rest position. The time delay imposed by the delay switch is sufficiently long to insure that the drive motor 68 is able to drive the spindle assembly 20 to its index position before being de-energized. To prevent possible damage to the drive motor 68 when pawl 89 engages the step on the ratchet wheel 87, the heavy duty friction clutch 85 is provided. The heavy duty clutch 85 can transmit higher maximum torque than clutch 84 so that clutch 84, rather than heavy duty clutch 85, will slip when the blanks 22 engage the cutter 52 during a cycle of operation.

Means within the control apparatus 86 automatically cause the clamping motive means 50 to raise the upper clamping block 28 and to thus free the cut optical elements for manual removal by the operator. The alignment member 42 is automatically returned to its rest position wherein it is positioned to assist in aligning the blanks to be cut in the succeeding cutting operation.

Structural implementations other than as described above are within the purview of this invention. For example, the apparatus might be constructed such that the cutter assembly moves into engagement with the blanks to be cut, rather than having the head assembly, including the spindle assembly, move the blanks into engagement with the cutter. Manual means other than a screw arrangement could be employed to adjust the position of the cam follower with respect to the cutter for making fine adjustments in the size of the finished optical element cut by the cutter. Or, alternatively, if a two-step operating cycle were employed, including a second step wherein a fine cut is made by the cutter after a preliminary rough cut, the means mounting the cam follower might be made automatically adjustable and the cutter could be programmed to make two complete cuts during the operating cycle, rather than one. Certain other changes may be made in the above apparatus without departing from the scope of the invention herein involved. It is intended that all matter contained in the above description shall be interpreted as illustrative and not in a limiting sense.

What is claimed is:

1. Apparatus for cutting from blanks of synthetic optical material optical elements having a predetermined profile, comprising:
   a head assembly including:
      a housing,
      a spindle assembly assuming an index position at rest, said spindle assembly including means for securely holding a blank,
      spindle drive means for rotating said spindle assembly, and
      spindle coupling means for effecting a driving connection between said spindle assembly and said spindle drive means;
   a cutter assembly including:
      a rotatably mounted cutter, and
      cutter drive means;
   motive means for bringing said cutter and said spindle assembly together before a cutting operation and for separating said cutter and said spindle assembly after the cutting operation, said motive means biasing said cutter and said spindle assembly together during the cutting operation, said spindle coupling means initiating a driving connection between said spindle assembly and said spindle drive means upon engagement of a blank by said cutter; and
   means for effecting during the cutting operation a varying displacement between said cutter and the axis of said spindle assembly corresponding to said predetermined profile, whereby from the blank said cutter cuts an optical element having said predetermined profile.

2. The apparatus defined by claim 1 wherein said spindle coupling means comprises:
   an input shaft driven by said spindle drive means; and
   a gear train between said input shaft and said spindle assembly for coupling a rotational input on said input shaft to said spindle assembly; and
wherein said motive means comprises:
   said spindle drive means;
   said input shaft; and
   a friction clutch between said input shaft and said housing, whereby a rotational input on said input shaft effects a rotation of said head assembly from a rest position until engagement of a blank with said cutter prevents further rotation of said head assembly, said engagement causing said friction clutch to slip and said spindle drive means to drive said spindle assembly through said gear train.

3. The apparatus defined by claim 2 including control means for effecting a reversal of said spindle drive means after said spindle assembly has been rotated through a complete revolution plus an additional displacement sufficient to insure the complete removal of scrap from the blank by said cutter, said head assembly being rotated away from said cutter against stop means defining said rest position, the engagement of said head assembly with said stop means causing said friction clutch to slip and said spindle drive means to drive said spindle assembly to said index position.

4. Apparatus for cutting from blanks of synthetic optical material optical elements having a predetermined profile, comprising:
   a head assembly including:
      a housing;
      a spindle assembly comprising:
         upper and lower rotatable shafts,
         upper and lower clamping blocks on said shafts, said blocks having mating surface configurations conforming generally to the surface configuration of a blank, and
         a cam on one of said shafts, said cam having said predetermined profile,
      spindle drive means for rotating said spindle assembly,
      spindle coupling means for effecting a driving connection between said spindle assembly and said spindle drive means, and
      first motive means for effecting relative movement between said clamping blocks for clamping a blank therebetween,
   a cutter assembly comprising:
      a rotatably mounted cutter,
      cutter drive means, and
      a cam follower for engaging and following said cam during a cutting operation; and
   second motive means for bringing said cutter and said spindle assembly together before a cutting operation and for separating said cutter and said spindle assembly after the cutting operation, said motive means biasing said cutter and said spindle assembly together during the cutting operation, said spindle means initiating a driving connection between said spindle assembly and said spindle drive means upon engagement of a blank by said cutter, said cam and said cam follower effecting during the cutting operation a varying displacement between said cutter and the axis of said spindle assembly corresponding to the profile of said cam and a finished optical element, whereby from each blank said cutter cuts an optical element having said predetermined profile.

5. Apparatus defined by claim 4 wherein said spindle coupling means comprises:
   an input shaft driven by said spindle drive means; and
   a gear train between said input shaft and said spindle assembly for coupling a rotational input on said input shaft to said spindle assembly; and
wherein said second motive means comprises:
   said spindle drive means;
   said input shaft; and
   a friction clutch between said input shaft and said housing, whereby a rotational input on said input shaft effects a rotation of said head assembly from a rest position until engagement of a blank with said cutter prevents further rotation of said head assembly, said engagement causing friction clutch to slip and said spindle drive means to drive said spindle assembly through said gear train.

6. The apparatus defined by claim 5 including control means for effecting a reversal of said spindle drive means after said spindle assembly has been rotated through a complete revolution plus an additional displacement sufficient to insure the complete removal of scrap from the blank by said cutter, said head assembly being rotated away from said cutter against stop means defining said rest position, the engagement of said head assembly with said stop means causing said friction clutch to slip and and said spindle drive means to drive said spindle assembly to said index position.

7. The apparatus defined by claim 6 including: indexing means for preventing the rotation of said spindle assembly in the reverse direction beyond said index position; and a second friction clutch interposed in said input shaft for preventing damage to said motor when said spindle is stopped at said index position by said indexing means, said second friction clutch being constructed and arranged to transmit greater maximum torque than said friction clutch between said input shaft and said housing.

8. The apparatus defined by claim 7 including alignment means mounted in a predetermined spaced relationship with said clamping blocks for facilitating proper alignment of a blank in said blocks, said alignment means including two vertical, mutually perpendicular aligning surfaces.

9. The apparatus defined in claim 8 including adjustment means for adjusting the position of said cam follower along a radial line from the axis of said spindle assembly, said adjustment means providing for fine adjustments in the size of an optical element cut by said cutter.

No references cited.

WILLIAM W. DYER, JR., *Primary Examiner.*
GERALD A. DOST, *Examiner.*